Aug. 11, 1936.  C. A. WIDMER  2,050,594
TOOL HOLDER AND POST
Filed April 6, 1935  2 Sheets-Sheet 1

INVENTOR.
CHARLES A. WIDMER
BY
ATTORNEY.

Aug. 11, 1936.    C. A. WIDMER    2,050,594
TOOL HOLDER AND POST
Filed April 6, 1935    2 Sheets-Sheet 2
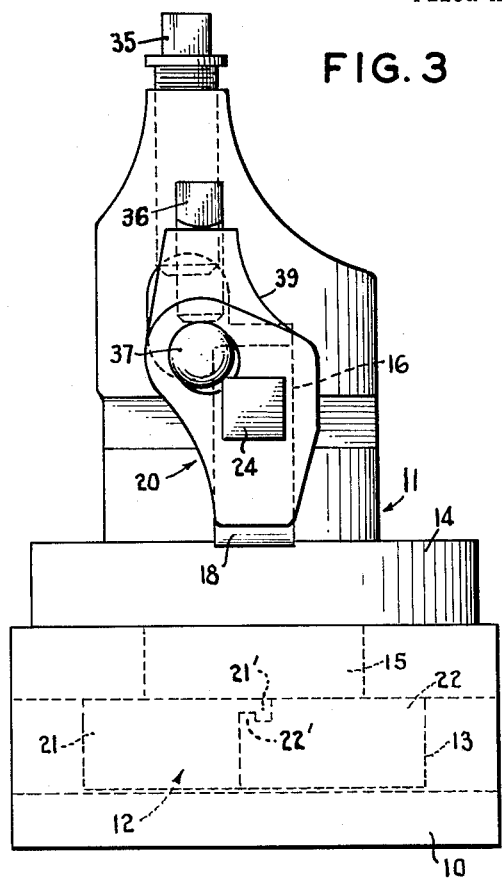
FIG. 3
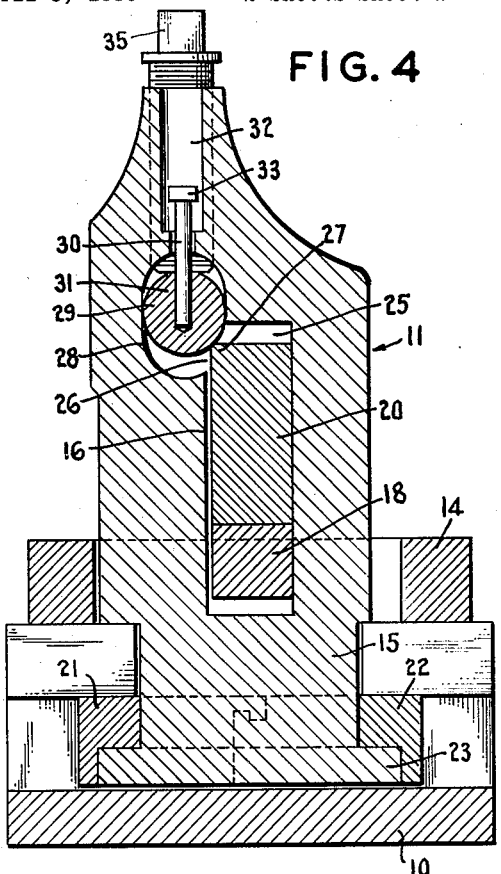
FIG. 4
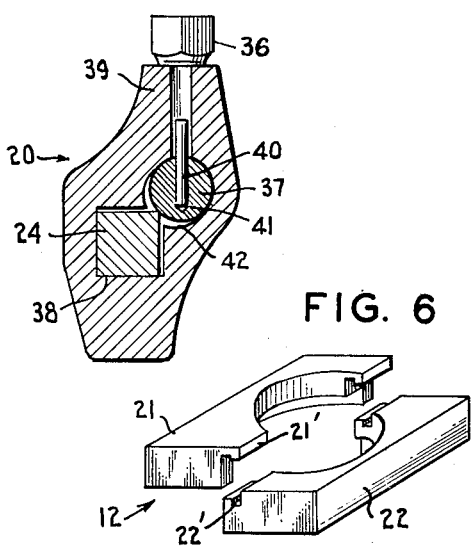
FIG. 5
FIG. 6
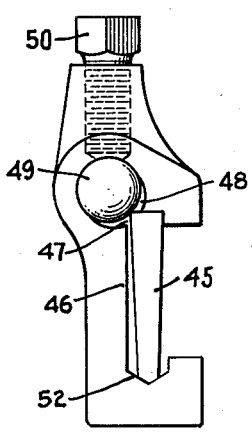
FIG. 7
INVENTOR.
CHARLES A. WIDMER
BY
ATTORNEY.

Patented Aug. 11, 1936

2,050,594

UNITED STATES PATENT OFFICE 2,050,594

TOOL HOLDER AND POST

Charles A. Widmer, Fairlawn, N. J.

Application April 6, 1935, Serial No. 14,983

7 Claims. (Cl. 82—37)

The invention relates to holding means for use in machining operations, for example, in securely positioning a tool bit in the tool bit holder and/or the shank of said holder in a tool post, and as utilized in lathes, planers, screw machines, boring machines, etc., in the turning and planing of metals, wood and the like.

It has for an object the provision of a holder device of simple, compact and efficient construction, and wherein the tool bit may readily be inserted and securely positioned, with reduction of over 50% of the usual screw pressure required, in its holder and/or the latter as well similarly inserted and securely positioned in a tool post, and as readily removed therefrom.

A further object of the invention resides in the provision of a holder device particularly suitable for retaining cutters constructed of high-speed steels and alloys such as "Stellite", tungsten-carbide, cobalt and the like in that chipping or breaking away of the material constituting the actual cutting edge of the tool is obviated.

A still further object of the invention resides in the novel arrangement of tool post assembly, and particularly in connection with the adjustment in a predetermined plane of the tool holder in a manner to avoid defacement of the holding element for said holder.

The nature of the invention, however, will best be understood when described in connection with the accompanying drawings, in which:

Fig. 3 is a front elevation thereof.

Fig. 4 is a transverse vertical section taken on the line 4—4, Fig. 2 of the drawings, and looking in the direction of the arrows, and Fig. 5 is a similar section thereof taken on the line 5—5.

Fig. 6 is a perspective exploded view of a cross-slide block.

Fig. 7 is a front elevation illustrating the application of the invention to a holder for a cutting-off tool.

Figure 1:
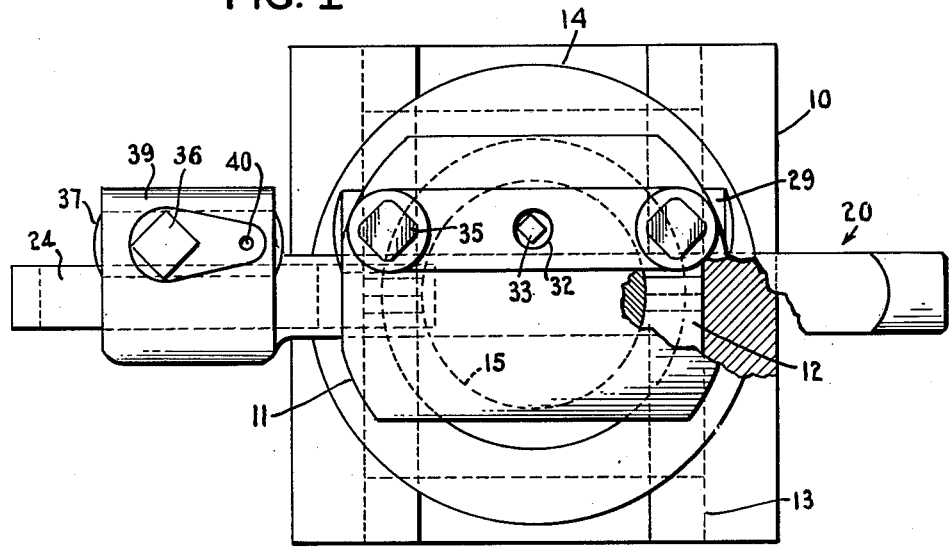
Fig. 1 is a plan view and Fig. 2 is a side elevation of a cross-slide bearing a tool post and tool holder, both of which embody the novel holding arrangement.
Figure 2:
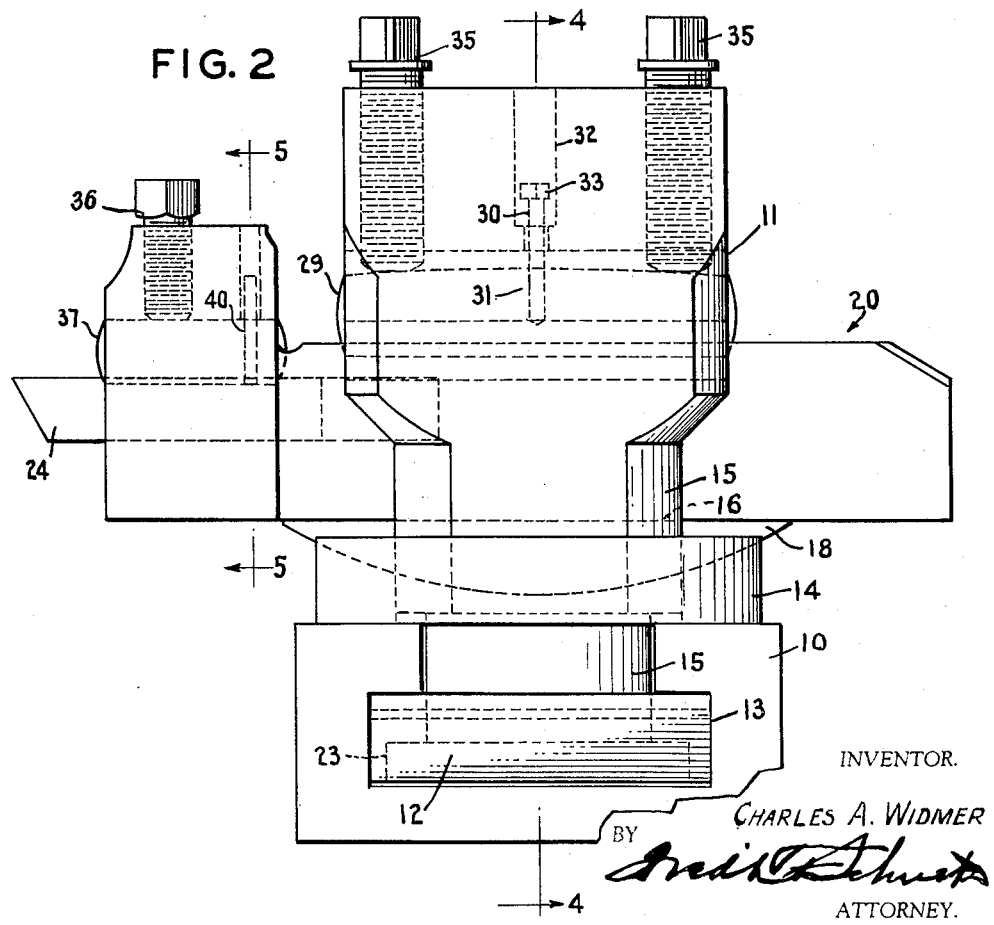

Aside from the usual direct set-screw holding of a bit in its holder and/or the latter in a tool post, it has been proposed to secure the holding of a tool bit or the like through the application of a wedge or of a grooved pad or block adapted to engage the bit.

In connection with the former expedient, it is to be noted that the wedge so jammed a bit as to render its removal difficult or impossible without first removing the holder from its carrier and applying a drift punch thereto, while the latter expedient frequently resulted in splitting of a pad or block along the bottom of the groove provided therein and as a result of crystallization of the material of said pad or block.

The present invention is concerned more especially with a novel means of holding such bit and/or holder in a manner to obviate all of the defects of the former devices and at the same time provide for a more efficient holding action.

To this end, the invention comprises a holder or body member having a rectangular socket provided longitudinally therein (at a slight angle to the longitudinal axis thereof, if desired) to receive the tool bit or its shank, as the case may be, designed to be firmly secured in position therein. This socket is cut away longitudinally at one corner so that the retained element may project thereat for engagement with a longitudinal holding block. This is movably retained in a further longitudinal socket merging with the tool socket, the two said sockets being preferably formed in one operation and affording an elongated, combined socket in which a cylindrical holding block is designed to move.

In case of a holder designed for retention of a tool bit, the socket therefor is generally square in cross-section, and in which case the holding block socket, which is elongated or more or less elliptical, is arranged with its major axis substantially coincident with the diagonal of the bit socket; whereas in the case of the holding of the shank of the tool holder, such socket axis is substantially parallel to the side wall of the socket for the holder.

By this expedient, when the holding block is urged toward the cut-away corner of a bit socket or a shank socket, line engagement is had through its periphery with the element retained therein; and the pressure is exerted directly, as by means of one or more set screws or the like, on the holding block and transmitted thereby both laterally and vertically to the retained member to force the same strongly against two adjacent side walls of its socket. This adequately retains the member in position therein until the pressure is relieved upon the said holding block.

Referring to the drawings, 10 designates a cross-slide for mounting a tool post 11, the latter being provided to this end with a split block 12 slidable in the T-slot 13 of the cross-slide and constituted of separable elements, as hereinafter more fully described. A ring 14 is designed to fit over the neck 15 of the post to rest upon the top of the slide and at the lower end of the tool post slot 16 provided longitudinally in the post. A rocker 18 is carried by ring 14 to position in the usual manner the tool holder 20 in the said post at the desired angle in a vertical plane.

To assemble the said post in the cross-slide 10, the block 12 is made separable (Fig. 6), comprising the bottom-recessed two halves 21 and 22 which fit over the lower end of the neck 15 and are provided with upper flanged and interlocking portions 21' and 22' inwardly directed and adapted to rest upon the flange 23 at the lower end of said neck. This split block, when located in the T-slot, will thus serve to hold the post therein to permit of adjustment of the same longitudinally of the slot; and said post is fixedly secured in the adjusted position thereon through the tool holder 20 bearing upon the ring 14, which is supported by oppositely disposed ledges at the top of the said cross-slide, through the intermediate rocker 18.

The securing of this tool holder in the tool post slot and the positioning also of said post with respect to the slide is effected as follows, the general arrangement being similar also to the securing of the tool bit 24 in its said holder 20. In both instances, a longitudinal socket, of substantially rectangular cross-section, is provided in the body portion for receiving the member to be retained, said socket being cut away at a corner thereof. Thus, in the case of the tool post, a socket 25 is provided longitudinally through the post 11 and is made somewhat larger in the one dimension in order to permit of tilting the tool holder to the desired angle. At its upper portion, moreover, the corner is cut away longitudinally, for example, at an angle of 45° to the major axis of the socket to provide a longitudinal opening 26. Through this opening the corresponding corner 27 of the tool holder 20 projects; and there merges into the said cut-away portion a further socket 28 juxtaposed to the socket 25 at said cut-away corner portion.

This latter socket 28 is somewhat elongated with its major axis parallel to a side wall of the socket 25 to accommodate a holding block 29 so that the latter may be forced, as hereinafter set forth, toward the corner 27 of the tool holder to exert a downward and lateral pressure thereon. The holding member or block, to this end, is constructed of cylindrical shape and is loosely mounted therein, being freely movable, in the present instance vertically, but anchored longitudinally in its socket by means of a pin 30 fitting firmly into a radial hole 31 of the holding member. This pin is introduced from the top of the tool post through a suitable hole 32 drilled therein and of larger diameter than the hole 31 to receive a head 33 at the outer end of said pin. The latter, moreover, rides freely in the hole 32 so as to allow ample play of the block in a vertical plane for tilting of the said tool holder with its rocker 18.

Pressure for forcing said block 29 toward the tool holder 20 is obtained by a pair of set screws 35 passing through the upper portion of the head of the tool post and engaging the upper surface portion of the said block which is, preferably, slightly convex toward the inner ends of said set screws to minimize damage to the surface when the holder is secured in a tilted or non-horizontal position. In the use of a pair of set screws and so located as to transmit pressure directly upon the ledges of the cross-slide, all tendency of deformation of the ring seat for the rocker is avoided.

Similarly, a set screw 36 is designed to exert pressure upon a cylindrical block 37 bearing upon the tool bit 24 which is mounted in a suitable socket 38 longitudinally provided in the tool holder 20, said screw passing through the head 39 at the forward portion of said tool holder. A pin 40 also passes loosely through this head into a radial hole 41 of the said pad and serves to fix this block longitudinally in its socket 42 which is juxtaposed to the socket 38. In this particular embodiment of the invention, the juxtaposed socket 42 is elongated in the direction of the diagonal of the square bit-retaining socket 38, allowing sufficient play of the block in the merged sockets for the said block to exert both a vertical and a lateral pressure upon the bit to force the same against the opposite adjacent walls of socket 38.

In Fig. 7, a similar arrangement is illustrated for the retention of a cutting-off blade 45 in a socket 46 which is open at its outer side as in the customary types of holders of this class. However, at its opposite side the corner is cut away as at 47 and the socket merges into a juxtaposed socket 48 in which is movably mounted, as in the previously described embodiments, a longitudinally disposed holding block 49 acted on by a set screw 50. Through the pressure exerted upon the block by the set screw, the former will press the blade 45 downwardly and laterally to firmly seat the same in an angular pocket 52 provided longitudinally along the bottom of the holder and receiving the correspondingly bevelled lower edge of the blade or cutter.

I claim:

1. A holder device for machine tools, comprising a body member affording a longitudinal socket to receive the element to be retained and being cut away longitudinally along one corner, there being a further longitudinal and elongated socket contiguous the element-retaining socket and merging therewith, a cylindrical holding block movably disposed in the contiguous socket for line engagement through its periphery with a corner of the retained element protruding through the cut-away corner of the retaining socket, a holding pin loosely mounted in the body member and firmly engaging with the cylindrical holding block to permit the latter to tilt but anchoring it against substantial movement longitudinally of the contiguous socket, and screw means movable in the body member for exerting directly pressure upon the portion of the holding block substantially opposite its retaining element engaging portion.

2. A holder device for machine tools, comprising a body member affording a longitudinal socket to receive the element to be retained and being cut away longitudinally along one corner, there being a further longitudinal and elongated socket contiguous the element-retaining socket and merging therewith, a cylindrical holding block movably disposed in the contiguous socket for line engagement through its periphery with a corner of the retained element protruding through the cut-away corner of the retaining socket, means to anchor the holding block against substantial movement longitudinally of the contiguous socket, and set screws adjustable in the body member and adapted to bear directly upon the portion of the holding block substantially opposite its retained element engaging portion, and the said pressure-receiving portion of the block being longitudinally convex toward the set screws.

3. A tool post for machine tools, comprising a neck portion affording a transverse socket to receive a tool holder and being cut away longitudinally along one corner, said neck terminating at its lower end in a flange, a slide-block supported thereon embodying two separable and interlocking halves, a cross-slide adapted to receive the block, a ring mounted over the neck to rest upon the upper surface of said cross-slide, a rocker movably supported by the ring and adapted to receive the tool holder, the neck portion at its upper end being provided with a further transverse socket contiguous the holder socket and merging therewith, a cylindrical holding block movably disposed in the contiguous socket for engagement with a corner of the holder protruding through the cut-away corner of its socket, means to anchor the holding block against substantial movement longitudinally of the contiguous socket but permitting the said block to tilt in accordance with the position of the said rocker, and means movable in the tool post for exerting pressure upon the portion of the holding block opposite its retaining element engaging portion to securely retain the holder to the ring and the latter to the cross-slide.

4. A tool post for machine tools, comprising a neck portion affording a transverse socket to receive a tool holder and being cut away longitudinally along one corner, said neck terminating at its lower end in a flange, a slide-block supported thereon embodying two separable and interlocking halves, a cross-slide adapted to receive the block, a ring mounted over the neck to rest upon the upper surface of said cross-slide, a rocker movably supported by the ring and adapted to receive the tool holder, the neck portion at its upper end being provided with a further transverse socket contiguous the holder socket and merging therewith, a cylindrical holding block movably disposed in the contiguous socket for engagement with a corner of the holder protruding through the cut-away corner of its socket, the surface substantially opposite being convex longitudinally of the block, means to anchor the holding block against substantial movement longitudinally of the contiguous socket but permitting the said block to tilt in accordance with the position of the said rocker, and set screws movable in the tool post for exerting pressure upon the convex portion of the holding block to securely retain the holder to the ring and the latter to the cross-slide.

5. A tool bit holder, comprising a body member or shank portion terminating at its outer end in a head portion provided with a longitudinal socket somewhat larger than the bit to be held therein and the socket being cut away longitudinally at an upper corner thereof, there being a further longitudinal and elongated socket contiguous the bit-retaining socket and merging therewith, a cylindrical holding block movably disposed in the contiguous socket for line engagement through its periphery with a corner of the bit protruding through the cut-away corner of the retaining socket, means to anchor the holding block against substantial movement longitudinally of the contiguous socket, and screw means movable in the body member for exerting directly pressure upon the portion of the holding block substantially opposite its bit engaging portion.

6. A cutting-off blade holder, comprising a body member provided with a longitudinal blade-retaining socket open along one side and grooved along the bottom, said socket being cut away longitudinally at an upper corner thereof, there being a further longitudinal socket contiguous the bit-retaining socket and merging therewith, a cylindrical holding block movably disposed in the contiguous socket for engagement with a corner of the bit protruding through the cut-away corner of the retained socket, means to anchor the holding block against substantial movement longitudinally of the contiguous socket, and means movable in the body member for exerting pressure upon the portion of the holding block substantially opposite its blade engaging portion.

7. A holder device for machine tools, comprising a body member affording a longitudinal socket to receive the element to be retained and being cut away longitudinally along one corner, there being a further longitudinal and elongated socket contiguous the element-retaining socket and merging therewith, a cylindrical holding block movably disposed in the contiguous socket for line engagement through its periphery with a corner of the retained element protruding through the cut-away corner of the retaining socket, and screw means movable in the body member for exerting directly pressure upon the portion of the holding block substantially opposite its retaining element engaging portion to develop a lateral and downward thrust upon said retained element to force it to its opposite socket walls.

CHARLES A. WIDMER.